United States Patent [19]

Zecher

[11] E Re. 30,977

[45] Reissued Jun. 22, 1982

[54] METHOD AND APPARATUS FOR DEFLASHING

[75] Inventor: Robert F. Zecher, Huntingdon Valley, Pa.

[73] Assignee: Finmac Incorporated, Hatboro, Pa.

[21] Appl. No.: 121,330

[22] Filed: Feb. 14, 1980

Related U.S. Patent Documents

Reissue of:

[64] Patent No.: 4,115,960
Issued: Sep. 26, 1978
Appl. No.: 791,726
Filed: Apr. 28, 1977

[51] Int. Cl.[3] ..... B24B 31/00

[52] U.S. Cl. ..... 51/422; 51/163.1; 51/313; 51/319; 134/25.4; 134/32; 134/68; 134/134

[58] Field of Search ..... 134/6, 25.4, 32, 68, 134/134; 51/163.1, 422, 423, 418, 319, 313

[56] References Cited

U.S. PATENT DOCUMENTS

| | | | |
|---|---|---|---|
| Re. 25,554 | 4/1964 | Leliaert | 51/163.1 |
| 1,224,191 | 5/1917 | Medgyes | 51/163.1 |
| 1,882,443 | 10/1932 | Peik | 51/163.1 |
| 3,079,735 | 3/1963 | Freeman | 51/163.1 |
| 3,594,956 | 7/1971 | Conover | 51/163.1 |
| 3,715,840 | 2/1973 | Davidson | 51/163.1 |
| 3,871,136 | 3/1976 | Isaacson | 51/163.1 |

FOREIGN PATENT DOCUMENTS

| | | |
|---|---|---|
| 503706 | 4/1939 | United Kingdom . |
| 778848 | 4/1939 | United Kingdom . |

*Primary Examiner*—Marc L. Caroff
*Attorney, Agent, or Firm*—Charles H. Lindrooth; Kenneth P. Synnestvedt

[57] ABSTRACT

A machine, and method, for tumbling objects or parts, generally of plastic material, to remove thin flange-like projections left along mold mating lines and frequently referred to as "flash". An advancing belt-like conveyor has a portion disposed to define an object-supporting surface so upwardly sloped in the direction of conveyor advance, as to cause tumbling and consequent deflashing of a mass of objects supported on said surface. The conveyor is also movable between two positions in which the objects are, respectively, loaded upon and automatically discharged from the conveyor. In the illustrated apparatus these are upper and lower positions. Tumbling occurs in the upper position, and discharge takes place in the lower position, under the influence of the advancing movement of the conveyor. The system includes mechanism for effecting additional cleaning of the objects, while tumbling on the conveyor, by subjecting them to a blast of impact cleaning media. The deflashed objects are conveyed during discharge to a terminal station of the system where they are stored in suitable receptacles.

Provision is made to modify the tumbling action, to accommodate the cleaning of objects of different sizes and shapes, by adjusting the speed of conveyor advance or the elevation of its sloped surface.

15 Claims, 3 Drawing Figures

METHOD AND APPARATUS FOR DEFLASHING

Matter enclosed in heavy brackets [ ] appears in the original patent but forms no part of this reissue specification; matter printed in italics indicates the additions made by reissue.

BACKGROUND OF THE INVENTION

In the manufacture of certain machine components, or other objects, particularly parts which are injection molded of metal or of materials known as plastics, it is necessary to remove thin flange-like projections, or "flash", left along mold mating lines, and also to smooth the parts and round sharp corners to reduce the chance of later chipping. Such deflashing usually precedes other post mold finishing operations, such as stamping, painting, electrical-lead forming and the like. It has been done by hand, and by known techniques such as tumbling masses of parts in baskets or barrel-like devices, frequently while subjecting the parts to a blast of deburring, abrasive, impact media, for example bits of walnut shell, sand or very small beads.

The blast technique is, per se, very advantageous, and while the above-mentioned tumbling techniques have also proven very useful, they are subject to a number of limitations. Most existing methods and apparatus for tumbling parts to remove flash, and for exposing the surfaces and inner sections to impact cleaning with media, are limited to occasional loading and unloading of relatively large batches within a tumbling basket, or to utilization of a sloped rotating drum through which the parts progress while tumbling. Basket type batch systems present problems relating primarily to the need for laborious manual loading and unloading operations. In some cases, this has been done by manual tilting of the basket, or by removing it from its drive plate and turning it over to discharge the parts. Since both loading and unloading must be done through the same basket opening, it is obvious that a basket system is not well adapted to automated in-line operation. Further, it is difficult to position blast guns or impellor wheels so that they will discharge into the basket opening without interfering with loading and unloading.

While a sloped tumbling barrel permits loading of parts from one end and discharge from the other, such a barrel does not readily afford access to the parts for impact cleaning. In such a barrel the parts usually are allowed to "walk" down the incline of the barrel as they tumble, thus receiving a timed exposure to the tumbling action. However, the exposure of individual parts is not necessarily uniform, as some parts will tend to "run" through the barrel at much faster rates than others. Additionally, while the speed of rotation of the barrel can be changed, thus affording some control of tumbling characteristics, the mechanical configuration of the barrel cannot be changed conveniently to allow still greater control over the tumbling action of different types of parts. Additionally, small batches of parts will not receive the same exposure and tumbling action as large batches, without modification of the physical arrangement of the barrel.

SUMMARY OF THE INVENTION

The method and apparatus which I have devised eliminates the aforesaid disadvantages, and has as its general objective the provision of an in-line system, which may be automated if that is desired, with loading at one station in the system and discharge from another station, at relatively convenient working heights, and with flexibility in adjusting the tumbling action to which the parts are subjected.

The apparatus of the invention has the following additional objectives and features:

It uses a very simple belt-type conveyor to tumble the parts and to convey them from the loading end to the discharge end of the system;

The tumbling system can be timed very accurately and simply in order that all of the parts may receive substantially the same tumbling exposure prior to discharge;

The system lends itself to adjustments which optimize the cleaning operation for a wide variety of parts or objects, and may also be adjusted to accommodate a range of batch sizes without adversely affecting the tumbling action;

The system lends itself well to use with either media blast guns, or media impellor wheels, to augment the cleaning achieved by tumbling;

The system may be used either separately as a tumbler only, and without a hood or enclosure, or it may be installed in a hooded cabinet for impact cleaning with media;

In addition, the concepts of the invention, in both the method and apparatus aspects, permit the ganging of several conveyor units in serial arrangement, and consequent accommodation of the system to a wide variety of cleaning functions.

In the achievement of these objectives I utilize a belt-type conveyor which has an upward slope during tumbling, which slope becomes greater in the direction of conveyor advance, and is such as to cause sustained tumbling in one zone of the system, as the conveyor advances beneath the mass of objects. After tumbling has been completed, the conveyor is lowered to a position in which the objects are automatically discharged therefrom under the influence of the advancing movement of the conveyor.

BRIEF DESCRIPTION OF THE DRAWINGS

In the accompanying drawings:

FIG. 1 is a somewhat diagrammatic side view, partly in section, showing a triple-unit system which incorporates the apparatus features of the invention and is adapted to practice the method thereof;

DETAILED DESCRIPTION OF THE ILLUSTRATED EMBODIMENT

Figure 3:
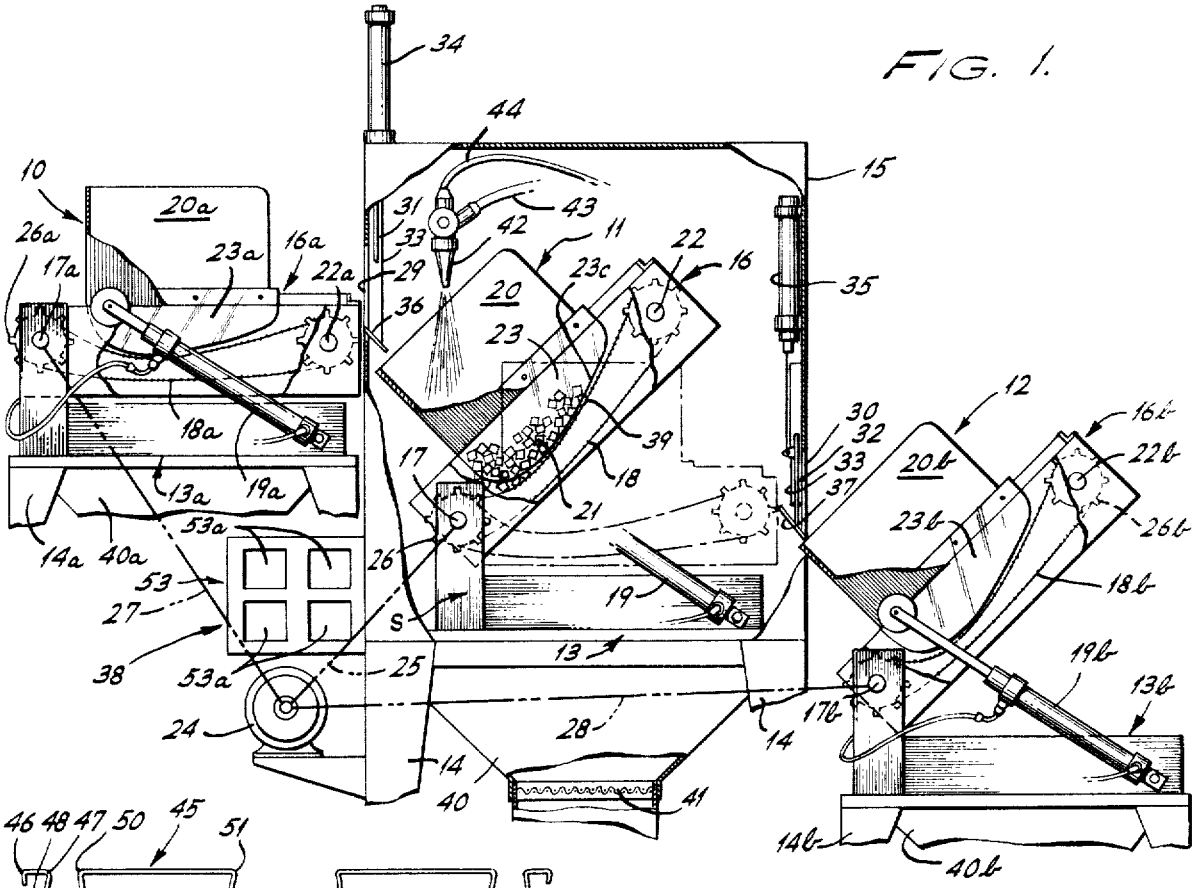
FIG. 3 shows a portion of a belt-like, chain link, conveyor utilized in the apparatus illustrated in the drawings.

With specific reference to the drawings, and initially to FIG. 1 thereof, there is illustrated, in somewhat diagrammatic form, a tumbling system in accordance with the invention. The illustrated embodiment includes three serially-connected tumbling units identified at 10, 11 and 12. In the system shown here by way of illustration, these units are of similar construction and one thereof will be described first in somewhat general terms and later with detailed reference to FIG. 2. As the description proceeds, it will be understood that while it is preferred to utilize several serially connected units, such use is not essential, since the major advantages of the invention may be achieved by utilization of a single unit.

Now considering the center unit 11, as illustrated somewhat diagrammatically in FIG. 1, it will be seen that it comprises base framing 13 which includes legs or supports 14 and a generally box-like hood 15 enclosing the tumbling unit 11. Upper frame structure 16 is swingably mounted upon the base framing 13 through the agency of an axle 17 which has its opposite ends journalled in upstanding supports S, and which axle serves also to support and drive one end of a belt-like conveyor 18. Means is provided to swing the upper frame structure 16 between a lower position shown in broken lines in FIG. 1, and an upper position shown in full lines. Preferably, and as illustrated, this means takes the form of a pneumatic piston and cylinder arrangement shown fragmentarily at 19. A container or hopper 20 is carried by the frame portion 16 and is open at the bottom, as well as at the right side as viewed in the drawings (compare FIG. 2). This hopper, as will be understood from consideration of FIG. 1, confines a mass of objects to be tumbled and cleaned. These objects are represented in the drawing at 21 and are supported by the hopper 20 in a position such that the lower layer of objects is in contact with a surface defined by a portion of the upper run of endless conveyor 18. This surface is described below, with reference to FIG. 2, and bears the reference numeral 39. As noted above, the conveyor has one end mounted on the axle 17. Its opposite end is mounted on another axle 22.

Figure 2:
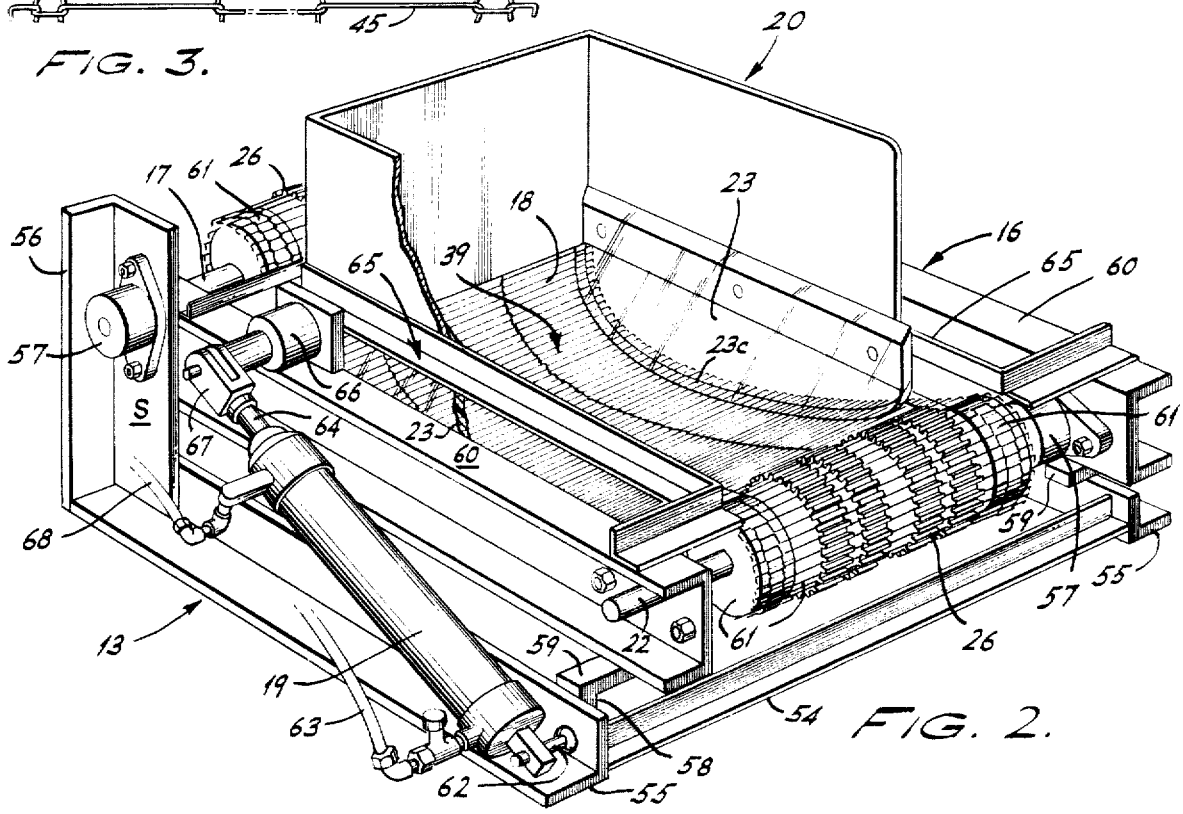
FIG. 2 is a detail perspective view of a single tumbling unit in accordance with the invention and in which certain parts are broken away in the interest of clarity of illustration.

Importantly, and as will be more fully discussed in what follows, the unit includes guide structure comprising spaced wall structures 23, each of which has a curved lower edge 23c across which the upper run of the conveyor 18 advances, and by which said upper run is guided and constrained to have a sloped contour. One of the spaced wall structures appears in the drawing. As best illustrated in FIG. 2 it is fabricated of a sheet of clear plastic material secured to the adjacent framing. The other, shown fragmentarily, is similar. In particular accordance with the invention, the contour of the curved lower edge [25c] *23c* is such that when the conveyor has been elevated to the position shown in full lines in FIG. 1, that is to the position in which the objects are tumbled upon the surface of the conveyor, the slope of said surface increases with the distance from the lower, drive, axle 17 toward the higher axle 22.

Drive means, which preferably comprises an electric motor 24 and a drive belt 25, is coupled to the conveyor 18, through cog wheels 26 carried by axle 17, and which will be described in greater detail with respect to FIG. 2. Preferably, and as shown, the motor 24 is utilized, through drive linkage indicated at 27 and 28, to energize the belt-like conveyors of the left hand and right hand units 10 and 12 also.

The hood or housing 15 includes loading and discharge apertures 29 and 30, respectively, each of which is controlled by a door operated by suitable pneumatic means. The door of the loading aperture is shown in its open position at 31, while the door of the discharge aperture is shown, in its closed position, at 32. Each door rides in channels, one of which is shown at 33, and is connected by suitable means to a pneumatic piston and cylinder actuating device. As will be understood without further description, the device 34 controls the loading door 31 and, as illustrated, has been adjusted to raise the door to open position. The piston (not shown) of device 35 occupies its lower position, and the discharge door 32 is therefore closed. Inclined chute means, shown at 36 and 37, is disposed at the lower edge of each of the openings 29 and 30, respectively.

Apparatus of any suitable type is employed to control: the piston strut 19, and thus the swinging movement of the conveyor unit; the speed of the conveyor; the angle through which it is swung upwardly; and also the pneumatic door control devices illustrated at 34 and 35. This control apparatus is represented by the box-like enclosure 38, to which further reference will be made in what follows.

The essential elements of the center unit 11 also appear in the left and right hand units 10 and 12, bearing similar reference numerals including, respectively, the subscripts a and b.

While the detailed construction of a tumbling unit in accordance with this invention will be best understood with reference to the description of FIG. 2, understanding of the operation of the system will be facilitated by the following functional description of the apparatus as illustrated in FIG. 1.

It will now be understood that the upper run of the conveyor 18 defines an object-supporting surface (see 39 in FIG. 2) which is so upwardly sloped, in the direction of advance of the upper run or portion of the conveyor, and during the tumbling operation, as to cause tumbling of the objects upon said surface 39. While the specific construction of the disclosed conveyor will be fully described with reference to FIG. 3, it is sufficient at this point to understand that it has the characteristics of a flexible belt and presents, at a given slope, such predetermined frictional resistance to gravitational sliding movement of the objects 21, as to retain such objects in the tumbling position shown in the drawings. In this position, the objects are pulled upwardly along the upper run of conveyor 18 (surface 39), by the action of the conveyor, slide back across the upper surface of the stack or batch of objects, and re-enter the stack at the lower left hand portion, from whence they repeat the climb. The slope of the surface increases in the direction of advancement, and reaches such slope that the objects can climb no further. As will be understood, flash is removed during the resultant tumbling operation, the objects being constrained to remain upon the surface of the conveyor portion 39 throughout the cleaning.

Now making reference to the left hand unit 10, objects loaded within its hopper 20a are given a preliminary cleaning therein, the conveyor 18a having been elevated by pneumatic device 19a to a position corresponding to the illustrated raised position of unit 11. After tumbling, the objects are caused to be loaded within the hopper 20 of the unit 11 by passing downwardly along the chute 36 and through opening 29, whence they pass within hopper 20 of unit 11, which occupies its illustrated upper position during loading as well as tumbling. The left hand unit 10 is, of course, caused to occupy its lower, illustrated, position during loading of unit 11, in order that the objects may be discharged from the end of the conveyor 18a, under the influence of the advancing movement of the conveyor, and pass through said chute 36, and into the container or hopper 20. The main tumbling operation is then performed in unit 11, with said unit in its raised position shown in full lines, at the completion of which the objects or parts are discharged from surface 39 of the upper run of the conveyor 18, under the influence of advancing movement of the conveyor, as was the case with conveyor 18a. The objects then pass down the chute 37, through opening 30, and enter the hopper 20b of unit 12, which then occupies its raised position as shown. Final cleaning or polishing is accomplished here, after which the right hand unit 12 may be moved toward its lower position, by the device 19b, and the objects are discharged into any suitable receptacle, not shown.

Disposed beneath each of the units 10, 11 and 12 is a funnel 40 (40a and 40b in the right and left units) having in the lower portion thereof a screen 41 through which the dust and particles of flash, as well as the cleaning media, pass to a cyclone separator and dust collector which need not be illustrated herein.

As indicated above, it is a feature of the invention that the tumbling cleaning operation may be augmented by further deflashing accomplished through the use of impact cleaning means. Such impact cleaning means is known per se, and as shown, comprises a nozzle 42, as well as conduits 43 and 44 by means of which impact media of the kind referred to above are discharged in a blast upon the objects tumbling within the hopper 20. Suitable media can be passed to the nozzle through the right conduit 43; left conduit 44 should be understood as leading to a source of air under pressure. The hood 15 serves to confine the dust and other detritus which arises from the blast operation, and all of this material passes through the funnel 40, and screen 41, and to the cyclone separator.

While a variety of belt-like [conveyor] *conveyors* may be employed, it is preferred to use a metal chain-link conveyor of the kind shown fragmentarily in FIG. 3. Such conveyor comprises a plurality of laterally extended cross links 45, each of which has generally right angle bends, as shown at 46 through 52, it being understood that the belt may be made of any desired width, simply by repeating the configuration resulting from bends 46–52. The manner in which the cross links 45 are associated with one another, to form the endless conveyor, will be understood from the drawing. For different sizes and/or shapes of objects to be deflashed, the link-belt may be made from wire of various gauges, and/or [assemblied] *assembled* with larger or smaller openings.

Preferably, and as shown, the several conveyors of the units 10, 11 and 12 are operated from a single prime mover, in this case the electric motor 24. However, in certain applications, particularly where different speeds are desired, individual motors may be employed. Alternatively, the conveyors may be driven by one motor, through [transmissions] *transmissions* of differing speeds, or through variable speed drives.

With further reference to the control means shown diagrammatically at 38, it will be appreciated that the invention [comtemplates] *contemplates* the use of any suitable type of control means. Preferably, it includes apparatus designated schematically by the numeral 53, for controlling the speed of advancement of the conveyors, in accordance with the size and type of the objects which are tumbling, as well as elements 53a which control the pneumatic piston devices 19, 19a and 19b. These latter elements are of such type so to permit adjustment of the degree of elevation of each of the conveyor units, further to accommodate adjustment of the tumbling action. Additional controls, not shown, are of course provided to energize the piston devices 34 and 35, and thereby control the doors 31 and 32, and also to energize and control the blast nozzle 42. In the broader aspect of the invention, an impellor wheel of known type may be employed to supply the stream of impact media, rather than the illustrated nozzle.

Now with reference to FIG. 2, the detailed construction of unit 11, which is representative of the three units of FIG. 1, appears on a larger scale. The lower, fixed, frame structure 13 comprises a forward cross-rod 54 and a pair of angle bars 55—55, which extend from the right-hand discharge end of the unit to the left-hand loading end thereof. At the loading end, the supports S are seen to take the form of upstanding angle bars, one of which appears at 56. The drive axle 17 is journalled within these bars through the agency of flanged bearing pads, one of which appears at 57. Upstanding frame structure 58 is carried by each of channels 55 and includes lateral extension means 59, which supports a pair of C-shaped channels 60—60, when the latter occupy the lower position shown in FIG. 2. The channels 60—60 overlie the angle members 55—55 and are supported at their left ends by virtue of pivotal securement to the axle 17, and at their right ends by contact with the extensions 59.

The chain-like conveyor 18 is, as indicated above, supported upon and driven by cog wheels 26, which are fixedly mounted on the two axles 17 and 22. The axle 22 is journalled within the webs of the C-shaped channels 60, by means of bearing pads 57, in a manner similar to the mounting of axle 17.

As clearly appears with reference to the right hand end of FIG. 2, a plurality of cog wheels are carried by each of axles 17 and 22 and engage the link conveyor. Suitable support wheels 61—61, which are devoid of cog teeth, underlie the opposite outboard edges of the conveyor. The cog wheel arrangement at the axle 17 is the same as that clearly illustrated at axle 22, and it will be understood that, as shown diagrammatically at 25, in FIG. 1, suitable belting and wheels (obscured in FIG. 2 by the wall of hopper 20) drivingly connect the motor 24 with shaft 17. The axis 22 is an idler axle, and its cog wheels 26 serve to position the link conveyor which is driven through axle 17.

As will now be understood, elevation of the conveyor assembly is controlled through the pneumatic device 19, which has its right end pivotally coupled to one of the angle members 55, of the lower fixed framing, in the manner shown at 62. When it is desired to raise the conveyor assembly, the piston (now shown) of device 19, is moved outwardly of its cylinder, by application of pressure through line 63. Since the piston rod 64 is linked to the conveyor frame support elements, including channels 60 and angles 65 (the latter serve also to space the channels 60 and support the side walls of hopper 20), through pivot block 66 and clevis 67, the channel bars, carrying the conveyor, are caused to swing upwardly about the axle 17. To return the conveyor to the illustrated lower position, in which the advancing conveyor discharges cleaned objects out through the open end of hopper 20 and over the idler axle 22, pressure is applied through conduit 68, to reverse the movement of cylinder in device 19.

The link conveyor 18 droops downwardly between its two axles, and the manner in which the desired slope of surface 39 is maintained, when the conveyor is elevated, will be appreciated by reference to the contour of the lower edge 23c of member 23. The latter member, with its companion member spaced across the width of the conveyor, serves as cam means which can be replaced with other cam means of different contour, should it be desired to change the slope of surface 39. The slope is, of course, also subject to adjustment by controlling the angle of elevation of the conveyor assembly through the appropriate one of devices 53a which form a part of the control device 38.

From the foregoing description it will be understood that the invention provides an improved method and apparatus for accomplishing deflashing, in an automated system, having provision for unusually convenient loading and unloading, and with a high degree of flexibility in adjusting the tumbling action to accommodate a variety of objects. It is a particular feature that the conveyor means, whether it comprises a single unit or several units, uses simple belt means both to tumble the objects and to transport them from the loading end of the system to the discharge end thereof.

It is also to be noted that the new system lends itself well to the use of media cleaning to augment the tumbling.

While a preferred embodiment of my invention has been illustrated and described, it will be evident that changes may be made therein without departing from the teaching of the invention. For example, it is possible to employ flexible conveyors other than the link belt shown, and in the broader aspect of the invention a variety of means may be used to control the elevation of the conveyor, the specific contour of its tumbling surface, and the speed of its advance. However, it will be understood that the invention contemplates such changes and modifications as come within the terms of the appended claims.

I claim:

1. In apparatus for tumbling objects to remove flash from the surfaces of such objects: belt-type conveyor means having associated therewith means defining an object loading zone and an object discharge zone; drive means for advancing said conveyor means in one direction past said loading zone and toward said discharge zone during tumbling and discharging operations; *guide means positioned along and engaging the conveyor along the path of movement of the conveyor between said loading and discharge zones, said* guide means [forming a portion of said conveyor means into a] *being shaped to constrain movement of a portion of the conveyor in a path of* shaped contour [surface] upwardly sloped in the direction of advance of said portion of the conveyor means for causing [substained] *sustained* tumbling of objects upon said surface during the tumbling operation; *and means for* effecting movement of [at least said portion of] said conveyor means *together with said guide means as a unit about the lower end of the conveyor* between a first, upper, loading position providing for tumbling of objects upon the conveyor means, and a second, lower position in which said objects are discharged from said discharge zone under the influence of the advancing movement of the conveyor means in said direction.

2. Apparatus according to claim 1, and further characterized in that said last means [effects] *provides for* angular swinging movement of [said portion of] said conveyor means between said positions.

3. Apparatus according to claim 1, and in which [the] *the guide means engaging the conveyor between the loading and discharge zones is shaped to provide an increasing* upward slope [of said portion] of said conveyor means [increases] in the direction of advance of said conveyor means.

[4. Apparatus according to claim 3 wherein the countour of the specified portion effects said increase in upward slope.]

5. Apparatus according to claim 1, and in which said conveyor means has the characteristics of a flexible belt and presents, when so sloped, such predetermined frictional resistance to gravitational sliding movement of such objects as to retain said objects in tumbling position.

6. Apparatus according to claim 5, and in which said conveyor means comprises a chain-like belt of the open wire type.

7. Apparatus according to claim 1, and further including impact cleaning means for augmenting deflashing during the tumbling operation.

8. Apparatus according to claim [11] *1*, and further including container means disposed in said loading zone and confining a mass of such objects above said surface and with a lower layer of objects in contact with said surface, said container means being movable with [said portion of] said conveyor means, between said two positions, and having wall portions configured to accommodate movement of said objects toward said discharge zone and discharge of said objects therefrom when moved to said lower position.

9. Apparatus according to claim 7, and further including hood-like shield means enclosing said [portion of said] conveyor means and the objects thereon, and in which apparatus said cleaning means takes the form of equipment for blasting impact media into contact with said objects and under said hood-like shield means.

[10. Apparatus according to claim 1, and in which said guide means comprises guide structure in association with which said belt advances and by which said portion is guided so as to have the recited sloped contour, as it passes adjacent to said structure.]

11. Apparatus according to claim 1, and further including means providing for modification of the tumbling action, to accommodate objects of different physical characteristics.

12. Apparatus according to claim 11, and in which said last-recited means includes means for adjusting the speed of conveyor advance.

[13. Apparatus according to claim 12, and further including means affording adjustment of the slope of said surface.]

14. Tumbling apparatus comprising a unit for tumbling objects, to remove flash therefrom, including an endless belt-type conveyor having associated therewith means defining a loading zone and a discharge zone[, means ]*; guide means engaging the conveyor along its path of movement between said loading and discharge zones; common* mounting *means for said guide means and* said conveyor *providing* for swinging movements *of said conveyor together with said guide means as a unit* between a first, upwardly angled position, and a second, generally horizontal, position; drive means for advancing said conveyor in one direction from said loading zone toward said discharge zone during a tumbling operation; *the* guide means *being* fixed with relation to said advancing conveyor and so constraining said conveyor as to cause the latter to present, as it passes over said guide means and when the conveyor is in said first position, such upward slope in the direction of advance, as to cause sustained tumbling of such objects upon the conveyor; and means for swinging said conveyor to said second position in which such objects are discharged from said discharge zone under the influence of the advancing movement of said conveyor in said direction.

15. Apparatus according to claim 14, comprising a plurality of such tumbling units, disposed in such serial relation to each other that discharge of objects from the conveyor of one such unit delivers such objects to the conveyor of another unit, when the conveyor of the discharging unit occupies its generally horizontal position, and the conveyor of an adjacent unit occupies its upwardly angled position.

16. In a method for [tumbling] *surface treatment of* objects *by tumbling the objects* upon an advancing *upwardly inclined* belt-like conveyor [to remove flash] *within a hopper positioned to enclose the conveyor*, the steps which include; so constraining the advancing belt-like conveyor that *at least* a portion of it [provides] *occupies a position providing* a surface which has such upward [slope] *inclination*, in the direction of conveyor advance, as to cause tumbling of objects supported upon said portion; loading a plurality of such objects upon said conveyor; causing advance of said conveyor in one direction while maintaining said [slope] *inclination*, with consequent tumbling of the objects [while the conveyor is in an elevated position] *within the hopper in said position*, for a period of time sufficient to remove flash from the objects; [and lowering said conveyor portion to a position] *and concurrently shifting both the position of the conveyor and the position of the hopper to change the inclination of the conveyor and of the hopper to a position* providing for discharge of said objects therefrom, while continuing the advance of said conveyor in said direction.

[17. In a method for tumbling objects upon unidirectionally advancing belt-like conveyor to remove flash, the steps which include: disposing said conveyor in an upwardly angled object-loading position; loading a plurality of such objects upon said conveyor; so constraining the advancing conveyor that a portion of it, when upwardly angled, provides a surface which has such progressively-increasing upward slope, in the direction of conveyor advance, as to cause sustained tumbling of the objects supported upon said surface; maintaining said slope, with consequent tumbling of the objects, for a period of time sufficient to remove flash from the objects; and disposing said conveyor portion in a lowered position, while continuing the advance of said conveyor, to provide for discharge of said objects under the influence of conveyor advance.]

*18. Apparatus for tumbling objects to effect surface treatment of such objects, comprising a belt-type conveyor one run of which is adapted to receive objects to be tumbled toward one end thereof and to discharge tumbled objects toward the other end thereof, the conveyor having generally horizontal rotative conveyor belt supports toward opposite ends thereof and having drive means for effecting advance of said one run in a direction toward the discharge end of the conveyor, means associated with said one run of the conveyor and establishing an object tumbling zone in a region intermediate the ends of said one run of the conveyor, guide means associated with the edges of the conveyor in said tumbling zone and guiding the motion of the conveyor through said zone, and mounting mechanism for the rotative conveyor belt supports and also for said guide means including means providing for angular movement of the guide means and of one of said supports about the axis of the other one of said supports, between a position inclined upwardly from the tumbling zone toward the discharge end of the conveyor to provide for tumbling of objects upon the conveyor downwardly in a direction away from the discharge end and a position precluding said tumbling and providing for carrying the objects by the conveyor in a direction from the tumbling zone toward the discharge end of the conveyor.*

*19. Apparatus for tumbling objects to effect surface treatment of such objects, comprising a belt-type conveyor one run of which is adapted to receive objects to be tumbled toward one end thereof and to discharge tumbled objects toward the other end thereof, the conveyor having generally horizontal rotative conveyor belt supports toward opposite ends thereof and having drive means connected with one of said supports for effecting advance of said one run in a direction toward the discharge end of the conveyor, guide means associated with said one run of the conveyor and establishing an upwardly inclined object tumbling zone in a region intermediate the ends of said one run of the conveyor, and common mounting mechanism for the rotative conveyor belt supports and for said guide means including means providing for angular movement of the conveyor as a whole together with said guide means about the axis of the rotative belt support with which the drive means is connected, between a position inclined upwardly from the tumbling zone toward the discharge end of the conveyor to provide for tumbling of objects upon the conveyor downwardly in a direction away from the discharge end and a position precluding said tumbling and providing for carrying the objects by the conveyor in a direction from the tumbling zone toward the discharge end of the conveyor.*

* * * * *

UNITED STATES PATENT AND TRADEMARK OFFICE

CERTIFICATE OF CORRECTION

PATENT NO. : Re. 30,977

DATED : June 22, 1982

INVENTOR(S) : Robert F. Zecher

It is certified that error appears in the above—identified patent and that said Letters Patent is hereby corrected as shown below:

Col. 6, line 40 "axis" should read --axle--.

Col. 8, line 11 "chain-like" should read -chain-link--.

Signed and Sealed this

*Fourteenth* Day of *February 1984*

[SEAL]

*Attest:*

GERALD J. MOSSINGHOFF

*Attesting Officer*

*Commissioner of Patents and Trademarks*